(12) United States Patent
Tracht (10) Patent No.: US 7,637,529 B2
(45) Date of Patent: Dec. 29, 2009

(54) VEHICLE SEAT SIDE AIR BAG SECUREMENT

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 233 days.

(21) Appl. No.: 11/687,258

(22) Filed: Mar. 16, 2007

(65) Prior Publication Data

US 2007/0222190 A1    Sep. 27, 2007

(30) Foreign Application Priority Data

Mar. 22, 2006  (DE) .................. 10 2006 013 231

(51) Int. Cl.
*B60R 21/00* (2006.01)
(52) U.S. Cl. .............. 280/728.3; 280/728.2; 280/730.1; 280/730.2; 297/216.12; 297/216.13
(58) Field of Classification Search .............. 280/730.1, 280/730.2, 728.3
See application file for complete search history.

(56) References Cited

U.S. PATENT DOCUMENTS

| | | | |
|---|---|---|---|
| 5,816,610 A | | 10/1998 | Higashiura et al. |
| 5,860,673 A | | 1/1999 | Hasegawa et al. |
| 5,927,749 A | * | 7/1999 | Homier et al. ........... 280/730.2 |
| 5,938,232 A | | 8/1999 | Kalandek et al. |
| 5,967,546 A | * | 10/1999 | Homier et al. ........... 280/730.2 |
| 6,045,151 A | | 4/2000 | Wu |
| 6,074,003 A | * | 6/2000 | Umezawa et al. ........ 297/216.1 |
| 6,095,602 A | * | 8/2000 | Umezawa et al. ........ 297/216.1 |
| 6,206,410 B1 | * | 3/2001 | Brown ..................... 280/728.3 |
| 6,237,934 B1 | | 5/2001 | Harrell et al. |
| 6,357,789 B1 | * | 3/2002 | Harada et al. ............ 280/730.2 |
| 6,588,838 B1 | | 7/2003 | Dick, Jr. et al. |
| 7,195,274 B2 | * | 3/2007 | Tracht ..................... 280/728.3 |
| 7,284,768 B2 | * | 10/2007 | Tracht ..................... 280/730.2 |
| 7,290,794 B2 | * | 11/2007 | Tracht ..................... 280/730.2 |
| 7,331,601 B2 | * | 2/2008 | Tracht ..................... 280/730.2 |
| 7,341,275 B2 | * | 3/2008 | Miyake et al. .......... 280/730.2 |

FOREIGN PATENT DOCUMENTS

| | | |
|---|---|---|
| DE | 698 32 718 T2 | 10/2006 |
| DE | 10 2005 037 045 A1 | 2/2007 |
| DE | 10 2005 037 044 A1 | 8/2007 |
| GB | 2 420 763 A | 6/2006 |
| JP | 11-78758 A | 3/1999 |
| WO | 99/21738 A1 | 5/1999 |

* cited by examiner

*Primary Examiner*—Toan C To
(74) *Attorney, Agent, or Firm*—Brooks Kushman P.C.

(57) ABSTRACT

A vehicle seat component includes a side air bag module mounted on a frame within a trim cover that also covers a seat pad. An air bag guide includes flexible inner and outer panels that extend between a release seam of the trim cover and the air bag module to provide a guiding function to an inflating air bag. An inner extremity of the flexible outer panel is secured to frame by a connector including at least one lace secured to a single connection location of the frame. One embodiment has a single lace and another has a plurality of laces, specifically three, that converge toward the single connection location.

9 Claims, 6 Drawing Sheets

VEHICLE SEAT SIDE AIR BAG SECUREMENT

CROSS-REFERENCE TO RELATED APPLICATIONS

This application claims foreign priority benefits under 35 U.S.C. § 119(a)-(d) to DE 10 2006 013 231.9, filed Mar. 22, 2006, which is hereby incorporated by reference in its entirety.

BACKGROUND OF THE INVENTION

1. Field of the Invention

This invention relates to a vehicle seat component side air bag module having an air bag guide with flexible inner and outer panels having inner extremities respectively secured to a frame of the seat component.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the pad outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

SUMMARY OF THE INVENTION

An object of the present invention is to provide an improved vehicle seat side air bag module for providing seat occupant protection.

A vehicle seat component constructed with the invention includes a frame for mounting on an associated vehicle on which the vehicle seat component is to be used. The frame has a lateral side frame member, and a seat pad is mounted by the frame and has a side extremity adjacent the lateral side frame member of the frame. A trim cover extends over the seat pad and has an air bag release seam adjacent the lateral side frame member and the adjacent side extremity of the seat pad. An air bag module is mounted on the lateral side frame member within the trim cover in a spaced relationship from its air bag release seam, and the air bag module includes an inflator and an air bag that is inflated by the inflator to project outwardly from the seat component through the air bag release seam of the trim cover. An air bag guide includes an inner panel and an outer panel that are each made of flexible material and have outer and inner extremities with their outer extremities connected to the trim cover adjacent the air bag release seam. The flexible inner and outer panels extend alongside each other from their outer extremities to the air bag module and thence respectively inwardly and outwardly of the air bag module. A first connector secures the inner extremity of the flexible inner panel to the seat component, and a second connector includes at least one lace extending from the inner extremity of the flexible outer panel to a single connection location on the frame at a spaced position from the first connector.

Each lace may be a cord, a strap, a band, a wire, or a chain, and when more than one lace is used there may be a combination of these types of laces.

The lateral side frame member disclosed is formed sheet metal and has one extremity to which the first connector is secured and another spaced extremity to which the second connector is secured.

The first connector includes a hooked retainer connected to the one extremity of the side frame member, and the second connector includes another hooked retainer that secures each lace to the single connection location of the other extremity of the side frame member. The second connector also includes a hooked retainer that secures the trim cover to the other extremity of the side frame member.

Also, the vehicle seat component has particular utility as a seat back and the formed sheet metal lateral side frame member is at an outboard location.

In one embodiment, the air bag guide includes a single lace that extends between the inner extremity of the flexible outer panel and the single connection location on the frame. That embodiment has the inner extremity of the flexible outer panel provided with sides that converge and have a vertex at which the single lace is connected to the inner extremity of the flexible outer panel.

In another embodiment, the air bag guide includes a plurality of laces that extend between spaced locations of the inner extremity of the flexible outer panel and the single connection location on the frame in a converging configuration. That embodiment is disclosed as having three laces that extend between the spaced locations of the inner extremity of the flexible outer panel and the single connection location on the frame in a converging configuration, and the inner extremity of the flexible outer panel has an edge at which the laces are connected.

The objects, features and advantages of the present invention are readily apparent from the following detailed description of the preferred embodiments when taken in connection with the accompanying drawings.

DETAILED DESCRIPTION OF THE PREFERRED EMBODIMENTS

Figure 1:
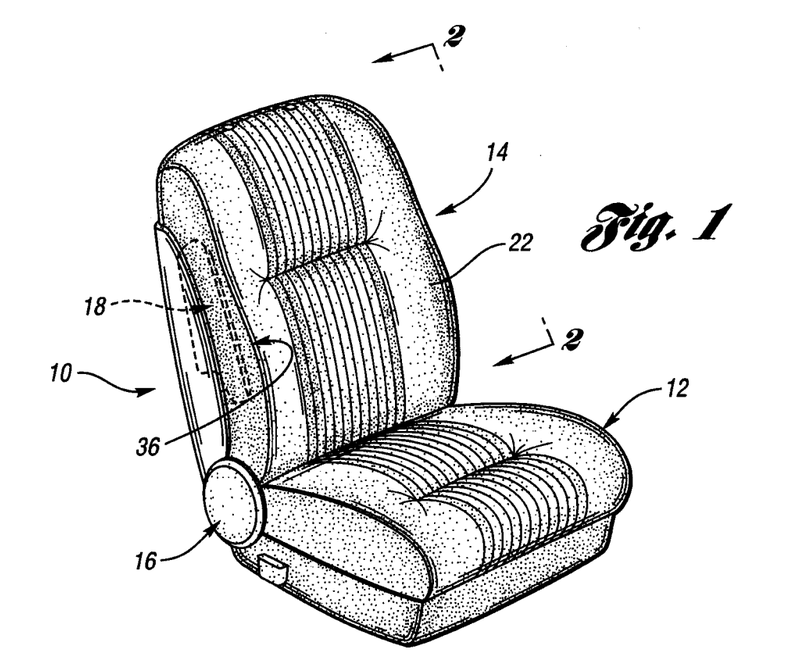
FIG. 1 is a perspective view of a vehicle seat including a seat back component constructed in accordance with the invention to include a side air bag module that is shown by hidden line illustration.
Figure 2:
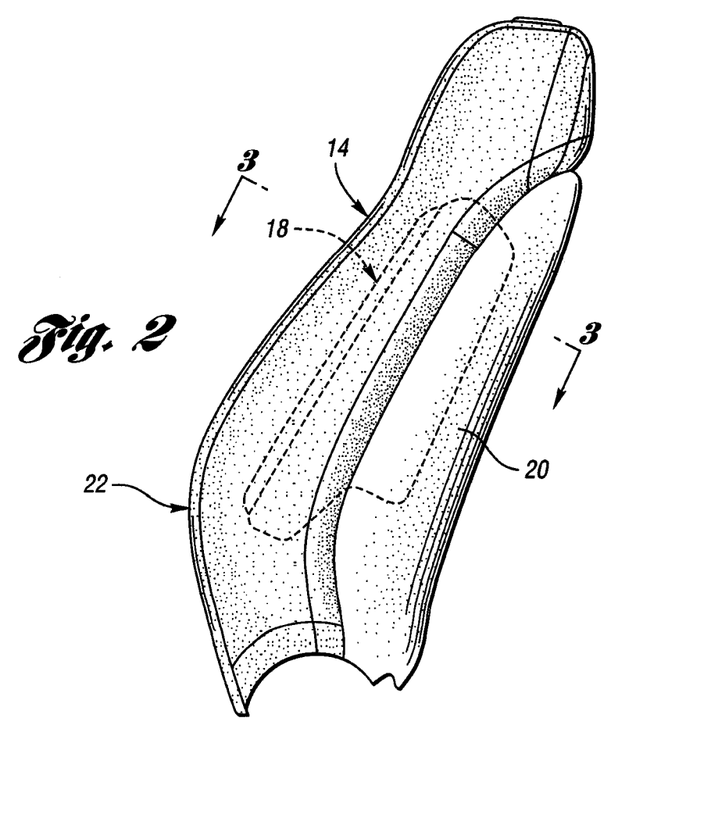
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that may be molded from plastic or pressed wood-chip resin. The seat back 14 also includes a front cushion 22 against which the seat occupant leans to provide back support and in which the side air bag module 18 is located.

Figure 3:
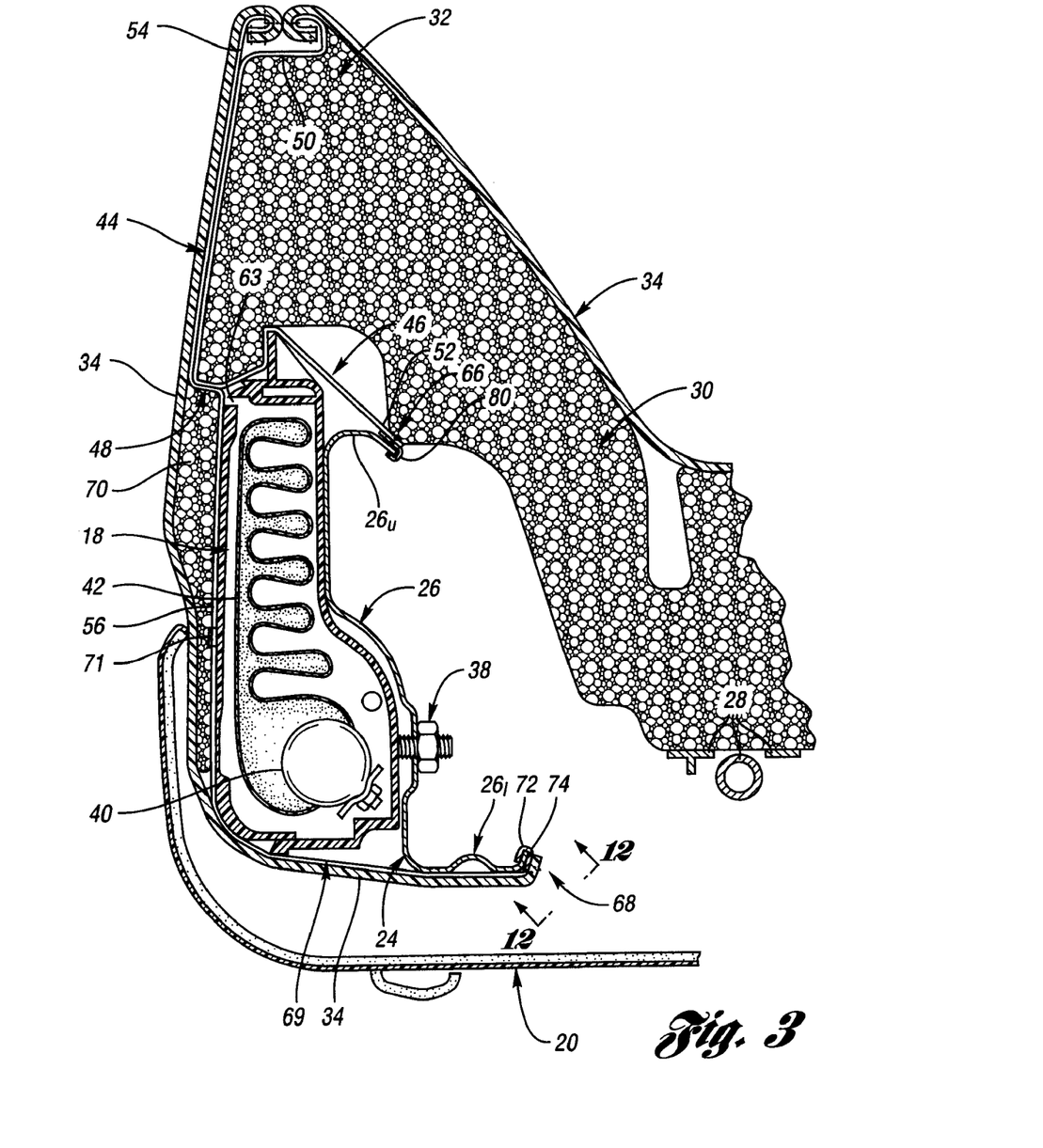
FIG. 3 is a partial sectional view taken through the seat back component along the direction of line 3-3 in FIG. 2 to further illustrate the construction of the side air bag module within the seat back component.

As shown in FIG. 3, the seat back component 14 includes a frame collectively identified by 24 and having a pair of formed sheet metal lateral side frame members 26 (only one shown) at its opposite lateral sides as well as having frame tubes and other components all of which are identified by 28. A foam seat pad 30 is mounted on the frame 24 in any conventional manner and has a side extremity 32 adjacent the side frame member 26. A trim cover generally indicated by 34 extends over the seat pad 30 and includes an air bag release seam 36 adjacent the left side extremity 32 of the seat pad which, as previously mentioned, corresponds to an outboard location. The side air bag module 18 is located within the trim cover 34 mounted on the frame 24, specifically by a threaded connection 38 on the side frame member 26 adjacent the air bag release seam 36 but in a spaced relationship from the release seam. The air bag module 18 includes an inflator 40 and a schematically illustrated air bag 42 which may be folded or rolled and, upon deployment, the air bag is inflated by the inflator to project outwardly from the seat component through the air bag release seam 36 of the trim cover 34.

Figure 3A:
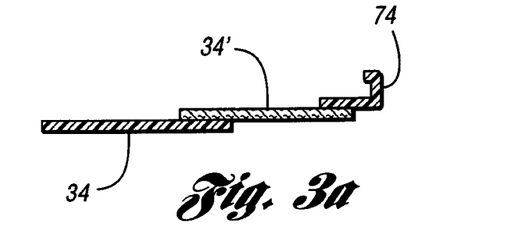
FIG. 3a is a partial view illustrating a modification of a trim cover which includes an extension for attachment to a frame of the seat back component.

The trim cover 34 may be made of cloth, vinyl or leather, etc. In some embodiments, the trim cover 34 within the back panel 20 includes an extension or extender 34' (FIG. 3a) secured thereto by stitching and/or adhesive, etc. for securement to the seat component structure as is hereinafter described. Such trim cover extensions can be made of any sufficiently strong and flexible material and can reduce the total cost of the trim cover without losing any aesthetic appeal since the back panel 20 hides the trim cover extension.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 36 and also has an inner extremity 52 as is hereinafter more fully described. The flexible outer panel 48 has an outer extremity 54 adjacent the air bag release seam 36 and has an inner extremity 56 which is hereinafter more fully described.

Figure 4:
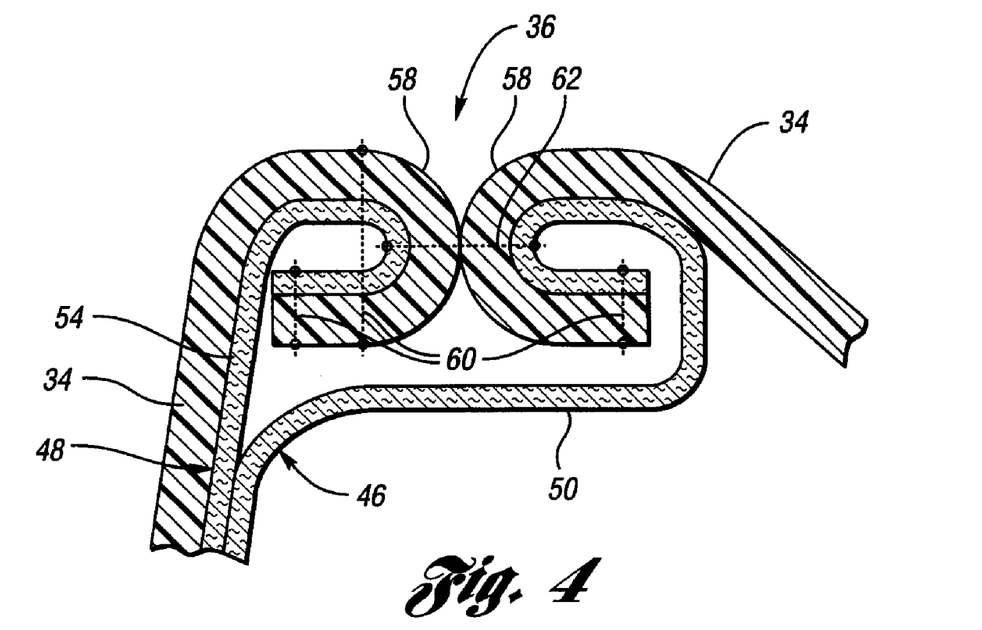
FIG. 4 is an enlarged view of a portion of FIG. 3 illustrating an air bag release seam of a trim cover of the seat back component.

As shown in FIG. 4, the air bag release seam 36 includes bent seam ends 58 of the trim cover 34 and the outer extremities 50 and 54 of the flexible inner and outer panels 46 and 48. Stitching 60 provides securement of the flexible panel outer extremities 50 and 54 to the trim cover 34 and stitching 62 provides securement of the bent ends 58 to each other. It is also possible for the stitching 60 to secure a release seam backing strip that extends therebetween and closes the release seam even when the stitching 62 partially tears due to extended normal use, etc.

From the air bag release seam 36 illustrated in FIG. 4, the flexible inner and outer panels 46 and 48 extend alongside each other as shown in FIG. 3 from their outer extremities 50 and 54 to the side air bag module 18 and thence inwardly and outwardly thereof for connection within the seat back component as is hereinafter more fully described. Upon deployment of the side air bag module 18, the air bag 42 moves through a module opening 63 and thence between the flexible inner and outer panels 46 and 48 which then provide a guiding function of the air bag 42 as it moves between the panels toward the air bag release seam 36 and eventually tears open the release seam for outward projection of the air bag to provide the occupant protection. The inner and outer flexible panels 46 and 48 may be made of any suitable flexible material effective to guide the air bag 42 from the module to the release seam. For example, a woven or non-woven cloth material, which may include natural materials or a synthetic material. Materials that are found to be effective are polyamide resin of the types from which the air bag 42 are manufactured. Regardless of the type of material used to make the air bag guide 44, the use of the air bag guide can be helpful in reducing friction on the air bag 42 as it is deployed. Although polymeric resins are particularly beneficial, even a fleece material will help reduce the friction on the air bag 42 because the air bag guide 44 prevents contact between the deploying air bag 42 and the seat pad 30. The air bag guide inner and outer panels 46 and 48 carry the force exerted by the air bag as it moves outwardly toward the release seam 36 so the foam seat pad and trim cover do not have to carry that force and can be designed without such requirement.

As shown in FIG. 3, the formed sheet metal side frame member 26 has one curved extremity $26_u$ and another curved extremity $26_l$ spaced from the one extremity. A first connector 66 also shown in FIG. 5 connects the inner extremity 52 of the air bag flexible inner panel 46 to the extremity $26_u$ of the side frame member 26 so as to secure the inner panel during deployment of the air bag as it is inflated by the inflator and guided by the air bag guide previously described. A second connector 68 including at least one lace 69 as shown by the embodiments of FIGS. 6 and 9 secures the inner extremity 56 of the air bag guide flexible outer panel 48 to the frame 24, specifically to the one extremity $26_l$ of the side frame member 26, at a single connection location 26a in a spaced location from the other extremity $26_u$ at which the first connector 66 secures the inner extremity 52 of the air bag guide flexible inner panel.

Securement of the inner extremities 52 and 56 of the flexible inner and outer panels 46 and 48 to the extremities of the side frame member 26 at spaced locations from each other distributes the loading applied by the air bag guide to the seat component during the air bag deployment.

The flexible inner panel 46 as shown in FIG. 3 extends from its outer extremity 50 to the air bag module 18 and thence in a skewed angular relationship from the air bag module to the first connector 66. It should be appreciated that the inner extremity 52 of the flexible inner panel 46 can be secured in other ways to the seat component, such as to the frame by extending between the air bag module 18 and the frame member 26 and having a hole through which the threaded connection 38 extends or by any other type of suitable securement to the seat frame. Furthermore, the flexible outer panel 48 extends from its outer extremity 54 to the air bag module 18 and thence along the air bag module to the second connector 68.

Figure 6:
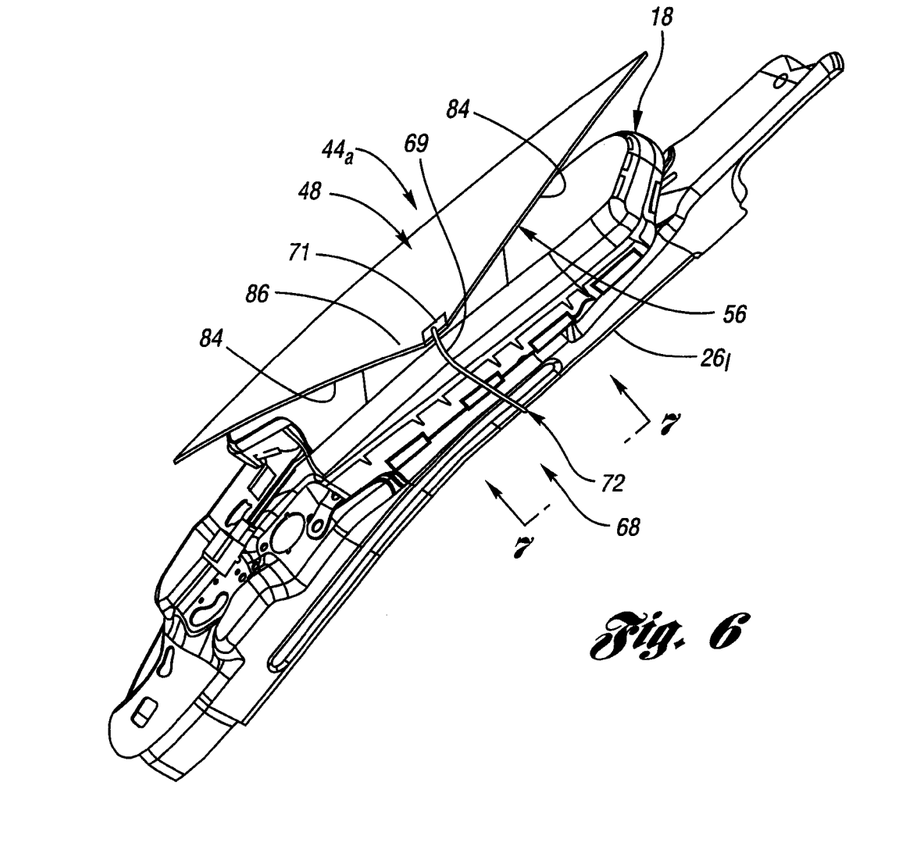
FIG. 6 is a perspective view of one embodiment of the invention wherein an inner extremity of a flexible outer panel of the air bag guide is secured by a single lace to a single connection location of the seat frame.
Figure 9:
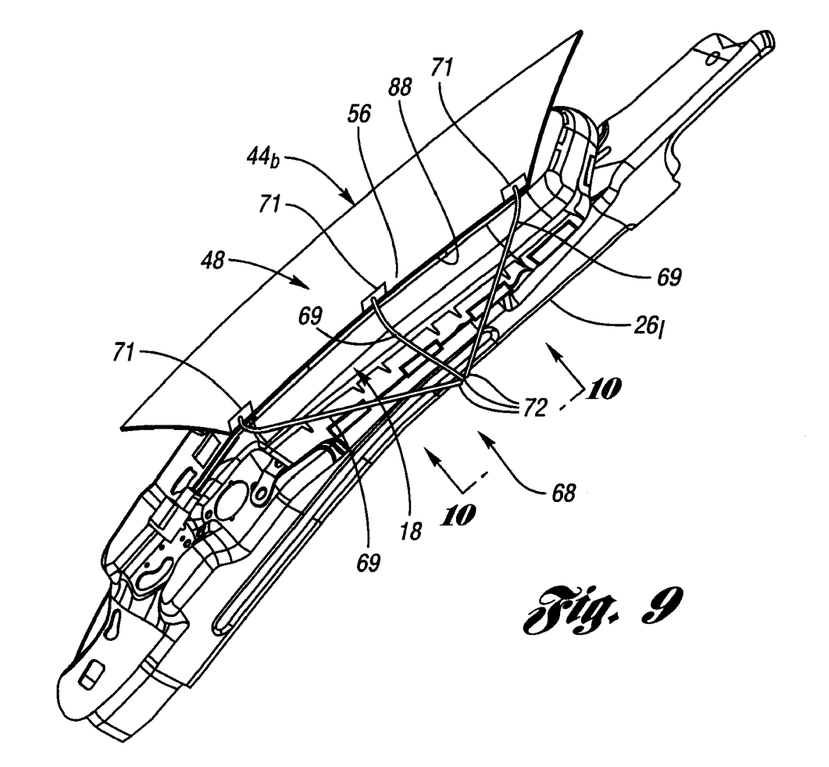
FIG. 9 is a perspective view of another embodiment of the invention wherein the air bag guide includes a plurality of laces that secure the inner extremity of its flexible outer panel to a single connection location of the seat frame.

With reference to FIGS. 3, 6 and 9, the flexible outer panel 48 has its inner extremity 56 located alongside the air bag module 18 and covered by a seat pad foam portion 70 shown in FIG. 3. The trim cover 34 covers the seat foam portion 70 that covers the outer panel inner extremity 56 which is secured to each lace 69 by a connector 71 as shown in FIGS. 6 and 9. These laces may be made of cords, straps, bands, wires or chains, etc. as well as combinations of these types of laces.

Figure 12:
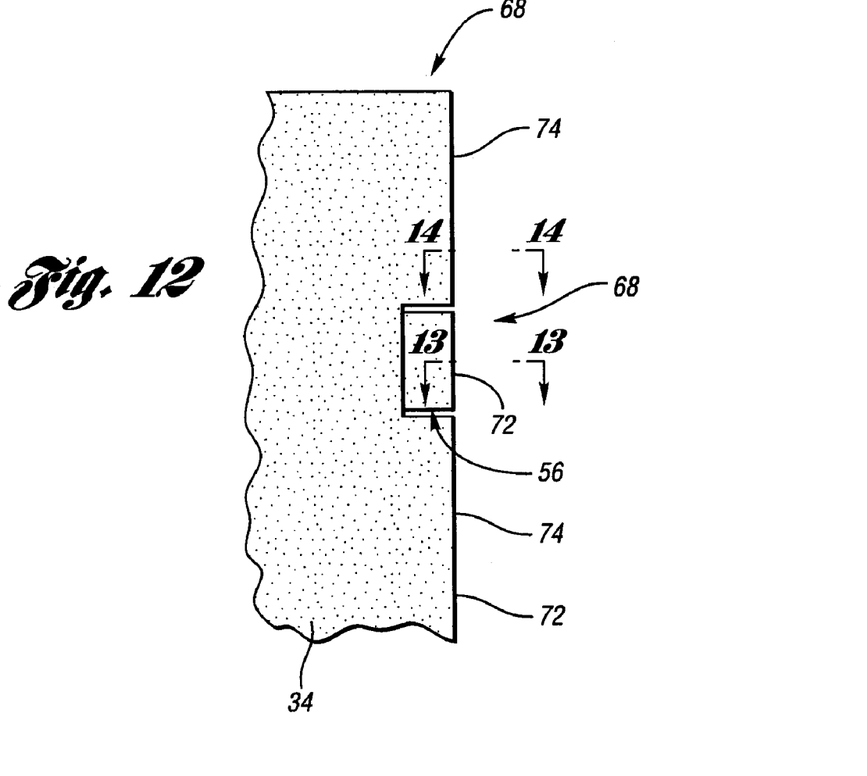
FIG. 12 is a view taken along the direction of line 12-12 in FIG. 3 to illustrate the lace and trim cover securement to the seat frame.
Figure 13:
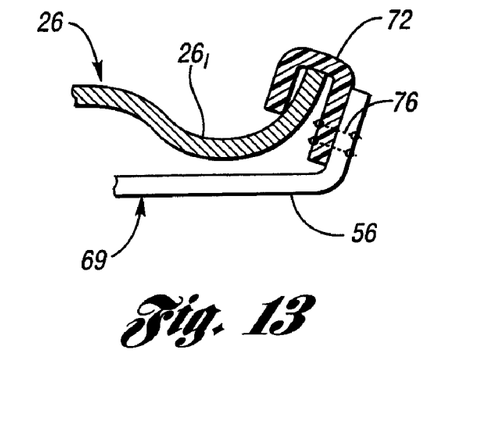
FIG. 13 is a sectional view taken along the direction of line 13-13 in FIG. 12 to further illustrate the lace securement.
Figure 14:
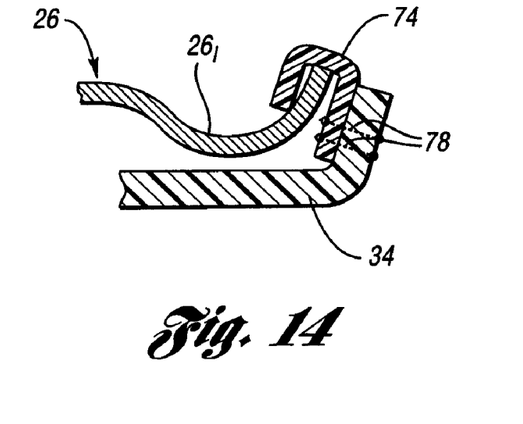
FIG. 14 is a sectional view taken along the direction of line 14-14 in FIG. 12 to illustrate the trim cover securement.

The second connector 68 is more fully illustrated in FIGS. 7, 8, 10 and 11 as a hooked retainer 72 that secures each lace 69 to the frame at its single connection location $26_a$. Each hooked retainer 72 may be a bent wire type connector as shown in FIGS. 7, 8, 10 and 11 or a bent strip type connector as shown in FIGS. 12 and 13. The bent strip type connector 72 as shown in FIG. 13 is secured by a suitable attachment 76 to the associated lace 69. Connector 68 also includes a hooked retainer 74 that secures the trim cover 34 to the frame 24 at its side frame member 26. The bent strip type hook retainer 74 is secured as shown in FIG. 14 by stitching 78 to the inner extremity of the trim cover 34 or to its extension as previously described in connection with FIG. 3a.

As shown in FIG. 12, hook shaped retainers may be interrupted for attachment of the retainer 72 to permit the lace securement of the inner extremity 56 of the flexible outer panel 48 to the extremity $26_l$ of the side frame member 26 prior to the installation of the foam portion 70 shown in FIG. 3. Thereafter, the trim cover 34 is wrapped around this foam portion 70 and its retainer 74 is secured to the extremity $26_l$ of the side frame member 26.

Figure 5:
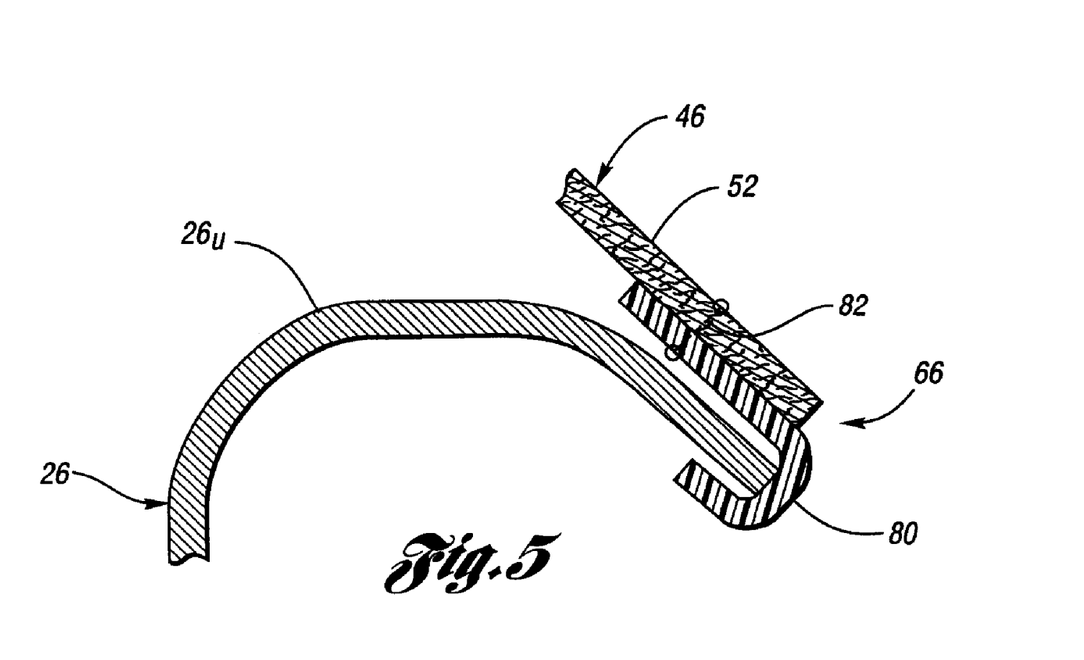
FIG. 5 is an enlarged view of a portion of FIG. 3 illustrating the manner in which an inner extremity of an air bag guide flexible inner panel is secured by a first connector to an upper extremity of a lateral side frame member.

With reference to FIG. 5, the first connector 66 is also a hooked retainer 80 secured to the inner extremity 52 of the flexible inner panel 46 by stitching 82 and hooked to extremity $26u$ of the side frame member 26.

While the side air bag module 18 described above has particular utility for use with a vehicle seat back, especially at its outboard location, it is also possible for the side air bag to be utilized with other vehicle seat components such as with a seat bottom.

It should also be appreciated that other types of securement can be used other than the hooked retainers even though such hooked retainers are preferred. For example, rivets, screws, hook and loop, and sharp tang retainers, etc. can be used. Furthermore the stitching disclosed for the release seam 36 and the retainer securement can also be performed by ultrasonic welding, adhesive, etc. Also, while the formed sheet metal lateral side frame member is disclosed, other seat frame members may be used such as tubular seat frames, and aluminum or magnesium die cast frames, etc. It should be appreciated that the foam portion 70, in addition to being located outwardly of trim cover 34 as shown, can be located inwardly of the trim cover 34 in direct contact with the air bag module 18. It is also possible for the seat to be constructed without the foam portion 70 in which case the inner extremity of the outer panel and the trim cover can be secured to the lateral side frame member by the same retainer.

Figure 7:
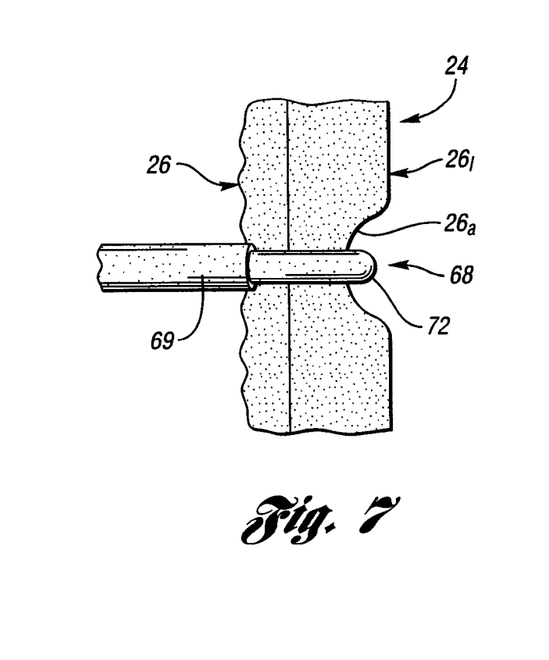
FIG. 7 is a partial view of the seat component taken along the direction of line 7-7 in FIG. 6 to illustrate the securement of the lace to the seat frame at the single connection location.
Figure 8:
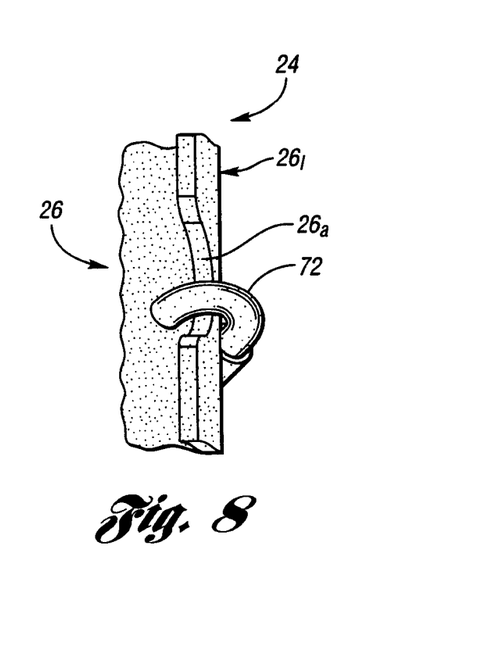
FIG. 8 is a perspective view taken from the back side of FIG. 7 to further illustrate the hook shaped retainer of a connection that secures the lace.

With reference to FIG. 6, one embodiment of the air bag guide $44_a$ includes a single lace 69 that extends between the inner extremity 56 of the flexible outer panel 48 and the single connection location $26_a$ (FIGS. 7 and 8) on the side frame member 26 of the frame 24. More specifically, in this embodiment, the inner extremity 56 of the flexible outer panel 48 has sides 84 that converge and have a vertex 86 at which the connector 71 secures the single lace 69 for its connection to the inner extremity of the flexible outer panel. Furthermore, as shown in FIGS. 7 and 8, the single connection location $26_a$ of the frame 24 includes a depression in the frame member 26 so as to prevent shifting of the retainer 72 along the frame member after installation.

Figure 10:
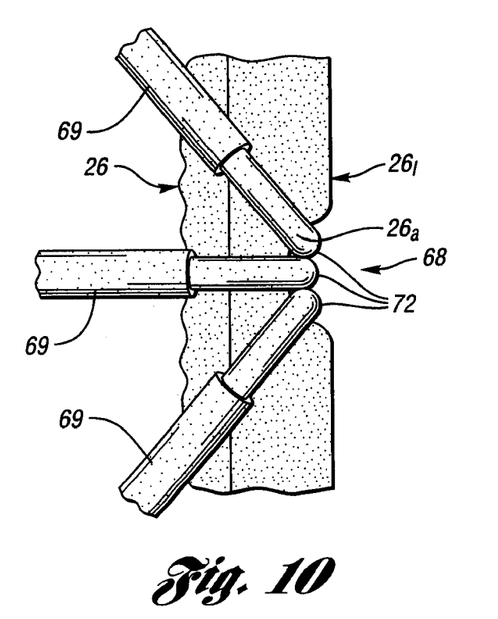
FIG. 10 is a view taken along the direction of line 10-10 in FIG. 9 to further illustrate the manner in which the three laces are secured to the seat frame.
Figure 11:
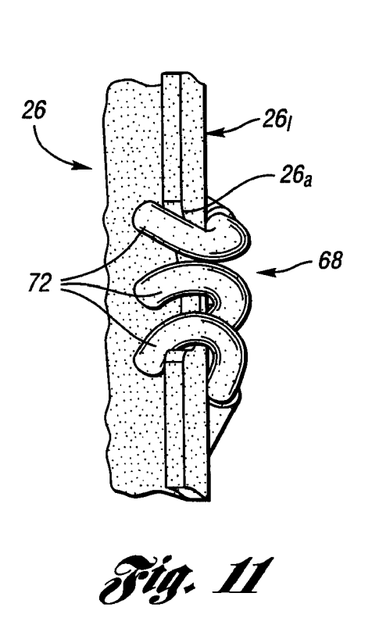
FIG. 11 is a somewhat perspective back side view of FIG. 10 showing the manner in which hooked retainers of the connector secure the three laces to the seat frame at its single connection location.

With reference to FIG. 9, another embodiment of the air bag guide $44_b$ includes a plurality of laces 69. These laces 69 are connected by the connectors 71 at spaced locations to the inner extremity 56 of the flexible outer panel 48 and extend in a converging configuration to the frame 24 at the single location $26_a$ where the retainer 72 of the connector 68 provides securement. This single connection location $26_a$ also is embodied as a depression that prevents shifting of the lace securement retainers 72 after installation. It should be noted as shown in FIG. 10 that each of the three retainer 72 is engaged at a slightly different position at the single connection location $26_a$ when viewed from a macro perspective as in this view. However, when viewed in the normal use scale as shown in FIG. 9, the lace securement retainers engage the frame at a single connection location with each other without any substantial amount of spacing between the retainers. Furthermore, the embodiment of FIG. 9 is disclosed as having three laces which are connected to the inner extremity 56 of the flexible outer panel 48 by the connector 71 at spaced locations. These three laces 69 extend from the spaced retainers 71 in a converging configuration to the single connection location $26_a$ where the retainers 72 are secured to the frame 24. Furthermore, the inner extremity 56 of the flexible outer panel 48 has an edge 88, with a shape that may be straight or curved, etc., where the spaced retainers 71 secure the laces 69.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A vehicle seat component comprising:
a frame for mounting on an associated vehicle on which the vehicle seat component is to be used, and the frame having a lateral side frame member formed from sheet metal and having two extremities spaced from each other;
a seat pad mounted by the frame and having a side extremity adjacent the lateral side frame member of the frame;
a trim cover extending over the seat pad and having an air bag release seam adjacent the lateral side frame member and the adjacent side extremity of the seat pad;
an air bag module mounted on the lateral side frame member within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities connected to the trim cover adjacent the air bag release seam, and the flexible inner and outer panels extending alongside each other from their outer extremities to the air bag module and thence respectively inwardly and outwardly thereof;
a first connector including a hooked retainer that secures the inner extremity of the flexible inner panel to the seat component at one extremity of the lateral side frame member of the frame; and
a second connector including at least one lace extending from the inner extremity of the flexible outer panel and including another hooked retainer that secures each lace to a single connection location at the outer extremity on the lateral side frame member of the frame at a spaced position from the first connector.

2. A vehicle seat component as in claim 1 wherein each lace is selected from the group consisting of: cords, straps, bands, wires, chains or combinations thereof for securing the inner extremity of the outer panel.

3. A vehicle seat component as in claim 1 embodied as a seat back and wherein the lateral side frame member is at an outboard location.

4. A vehicle seat component as in claim 1 which includes a single lace that extends between the inner extremity of the flexible outer panel and the single connection location on the frame.

5. A vehicle seat component as in claim 4 wherein the inner extremity of the flexible outer panel has sides that converge and have a vertex at which the single lace is connected to the inner extremity of the flexible outer panel.

6. A vehicle seat component as in claim 1 which includes a plurality of laces that extend between spaced locations of the inner extremity of the flexible outer panel and the single connection location on the frame in a converging configuration.

7. A vehicle seat component as in claim 6 which includes three laces that extend between the spaced locations of the inner extremity of the flexible outer panel and the single connection location on the frame in a converging configuration, and the inner extremity of the flexible outer panel having an edge at which the laces are connected.

8. A vehicle seat back component comprising:
a frame for mounting on an associated vehicle on which the vehicle seat back component is to be used, and the frame having a lateral side frame member;
a seat pad mounted by the frame and having a side extremity adjacent the lateral side frame member of the frame;
a trim cover extending over the seat pad and having an air bag release seam adjacent the lateral side frame member and the adjacent side extremity of the seat pad;
an air bag module mounted on the lateral side frame member within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof, and the inner extremity of the flexible outer panel having sides that converge have a vertex;
a first connector for securing the inner extremity of the flexible inner panel to the seat component; and
a second connector including a single lace extending from vertex of the converging sides of the inner extremity of the flexible outer panel to a single connection location on the frame at a spaced position from the first connector.

9. A vehicle seat back component comprising:
a frame for mounting on an associated vehicle on which the vehicle seat back component is to be used, and the frame having a lateral side frame member;
a seat pad mounted by the frame and having a side extremity adjacent the lateral side frame member of the frame;
a trim cover extending over the seat pad and having an air bag release seam adjacent the lateral side frame member and the adjacent side extremity of the seat pad;
an air bag module mounted on the lateral side frame member within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof, and the inner extremity of the flexible outer panel having a generally straight edge;
a first connector for securing the inner extremity of the flexible inner panel to the seat component; and
a second connector including a plurality of laces extending from spaced locations on the generally straight edge of the inner extremity of the flexible outer panel to a single connection location on the frame at a spaced position from the first connector.

* * * * *